March 31, 1942. K. J. KOLLMANN 2,278,324
COUPLING
Filed April 27, 1940
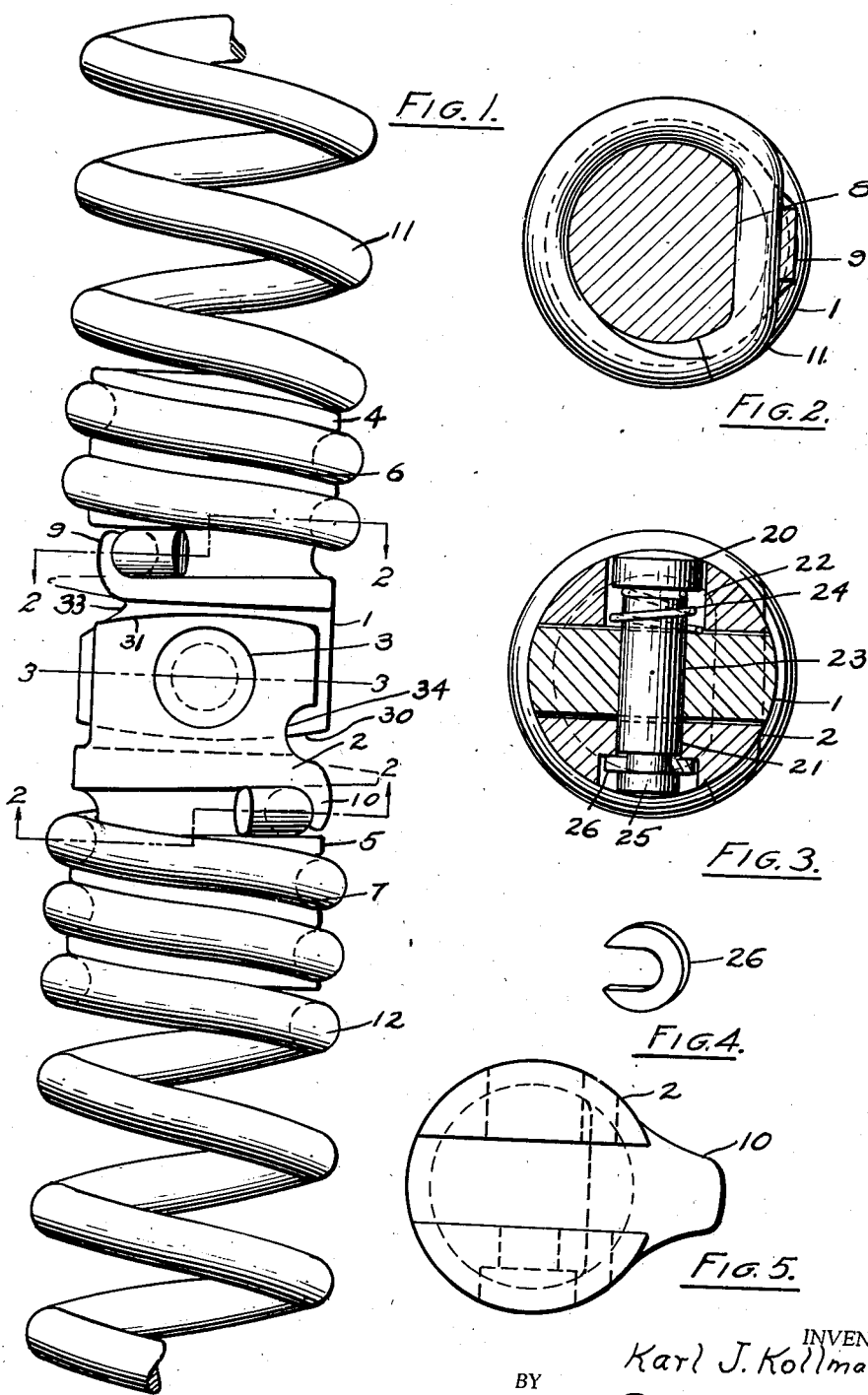
INVENTOR.
Karl J. Kollmann
BY Florian G. Miller
ATTORNEY.

Patented Mar. 31, 1942

2,278,324

UNITED STATES PATENT OFFICE 2,278,324

COUPLING

Karl J. Kollmann, Erie, Pa.

Application April 27, 1940, Serial No. 332,113

2 Claims. (Cl. 287—75)

This invention relates generally to couplings and more particularly to couplings for open helically wound rods.

All couplings of this character made according to the prior art and with which I am familiar have not been satisfactory because they would break loose when the open helically wound boring rods encountered any appreciable amount of torque. One of the prior methods of connecting helically wound rods to coupling members has been by welding, but it was found that the welds would break loose and free the helically wound rods. This was due to the inherent flexible nature of the rods. It is a serious matter when rods of this character used for cleaning sewer lines break at distances sometimes one hundred (100) feet from the entrance point. It is necessary in these cases to dig up the sewer line to remove the open helically wound boring rods. These lines usually contain roots growing through the joints of the pipe sections and other debris which puts a severe strain on the boring rods. Other means have been used for connecting the open helically wound rods to the coupling member, but it was found that there were too many mechanical parts which were easily breakable and were very unsatisfactory. Prior means for connecting together different sections of open helically wound rods has also proved unsatisfactory because of the number of mechanical parts required in that when the boring rods are removed from the pipe line, it is so full of mud, debris, and the like that the rods could not be unfastened without considerable amount of work and wastage of time.

It is an object of my invention to overcome the above and other defects in couplings for open helically wound rods. It is more particularly an object of my invention to provide a coupling for open helically wound rods which is simple in construction, cheap in cost, economical in manufacture, and easy to assemble.

Another object of my invention is to provide a coupling for open helically wound rods which requires no welding.

Another object of my invention is to provide a coupling for open helically wound rods which prevents undue strain on any particular section of the open helically wound rods.

Another object of my invention is to provide simple means for connecting together sections of open helically wound rods.

Other objects of my invention will become evident from the following detailed description taken in conjunction with the accompanying drawing in which:

Fig. 1 is a plan view of my novel coupling for open helically wound rods.

Fig. 2 is a view taken on the line 2—2 of Fig. 1.

Fig. 3 is a view taken on the line 3—3 of Fig. 1.

Fig. 4 is a perspective view of the washer used with the connecting bolt shown in Fig. 3.

Fig. 5 is a side elevational view of the female coupling member showing the outwardly extending portion integral therewith before it is peened over the end of the open helically wound rod to lock it in position.

Referring to the drawing, Fig. 1 shows a coupling for open helically wound rods comprising a male member 1, female member 2, and a pin or bolt 3 for connecting the male and female connecting members together. The male and female members 1 and 2 have integral longitudinally extending portions 4 and 5 with helical grooves 6 and 7 formed therein. The groove nearest to the central portion of the male and female members 1 and 2 is milled or cut as shown at 8 in Fig. 2. The milled portion 8 is flat and parallel to a tangential line on the periphery of the innermost portion of the groove. Male and female members 1 and 2 have outwardly extending locking lips 9 and 10 which are peened over the end of the open helically wound rods 11 and 12 disposed in the helical grooves 6 and 7. The locking lips 9 and 10 are of substantial width in order to provide securing locking means for the end of the helically wound rods 11 and 12. The coupling members 1 and 2 have curved surfaces 30 and 31 to permit a substantial amount of universal movement of the coupling members relative to each other. The coupling members 1 and 2 are cut away at 33 and 34 adjacent to the locking lips 9 and 10 in order that the lips may be peened over the ends of the boring rods 11 and 12.

Connecting bolt 3, shown more particularly in Fig. 3, comprises the bolt having a head 20 and shank portion 21 disposed in the apertures 22 and 23 in the male and female coupling members 1 and 2. The length of the bolt 3 is equal to or less than the outside diameter of the coupling members 1 and 2 in order that it will not obstruct the turning of the open helically wound rods 11 and 12 when they are rotating in a pipe line. A coil spring 24 is telescopically disposed around the shank portion 21 of the bolt 3 adjacent to the head 20. The opposite end of the bolt has a groove 25 formed therein for reception of a U shaped washer 26 which secures the bolt in position against the force of the spring 24.

In assembling my novel coupling members on the ends of the helically wound rods, the male and female coupling members 1 and 2 are screwed into the end of the open helically wound rods 11 and 12 until the free ends of the open helically wound rods 11 and 12 reach a point wherein they can be pressed against the milled flat portion 8 with the end of the open helically wound rod extending a short distance over the end of the milled portion as shown in Fig. 2 to provide a more secure connection. The outwardly extending locking lips 9 and 10 are peened over as shown in Fig. 1 to hold the free ends of the open helically wound rods 11 and 12 in a position adjacent the flat portion 8 on the male and female coupling members 1 and 2.

After the male and female members 1 and 2 are firmly secured to the ends of the open helically wound rods 11 and 12, they are assembled together as shown more particularly in Fig. 3. The bolt 3 is passed through the apertures 22 and 23 in the male and female members 1 and 2 wherein the washer 26 is disposed in a groove 25 on the end of the shank 21 of the bolt 3 against the force of a spring 24 to firmly secure the male and female coupling members 1 and 2 together.

It will be evident from the above description that I have provided a coupling for open helically wound rods which requires no welding, which prevents undue strain on any particular part of the open helically wound rods, which permits rotation of the rods in the pipe line without obstruction, and which provides a very secure and easily assembled coupling member for the ends of the open helically wound boring rods. I have also provided a simple means for connecting the male and female members of the coupling together.

Various changes may be made in the specific embodiment of the present invention without departing from the spirit thereof or from the scope of the appended claims.

What I claim is:

1. In combination with a coupling for open helically wound rods comprising a member having helical grooves with a portion of the grooves cut away to a flat surface, a helically wound coil disposed in each of said grooves, the free end thereof pressed onto said flat surface and a locking lip for securing the end of the said, helically wound rods on said flat surface.

2. A coupling for open helically wound rods comprising a male and female member having helical grooves formed therein, the innermost grooves having flat cut away portions, helically wound members disposed in said grooves, locking lip members integral with said male and female members for securing the ends of the said helically wound rods on said flat cut away portion, and connecting means for said male and female members.

KARL J. KOLLMANN.